(12) United States Patent
Maeda

(10) Patent No.: US 9,643,730 B2
(45) Date of Patent: May 9, 2017

(54) AIRCRAFT DOOR AND AIRCRAFT COMPRISING THE SAME

(71) Applicant: MITSUBISHI AIRCRAFT CORPORATION, Aichi (JP)

(72) Inventor: Ichiro Maeda, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 0 days.

(21) Appl. No.: 14/290,257

(22) Filed: May 29, 2014

(65) Prior Publication Data

US 2014/0353428 A1 Dec. 4, 2014

(30) Foreign Application Priority Data

Jun. 3, 2013 (JP) ................................. 2013-116974

(51) Int. Cl.
*B64C 1/14* (2006.01)
*B64D 41/00* (2006.01)

(52) U.S. Cl.
CPC .............. *B64D 41/007* (2013.01); *B64C 1/14* (2013.01)

(58) Field of Classification Search
None
See application file for complete search history.

(56) References Cited

U.S. PATENT DOCUMENTS

| 2,634,656 | A | * | 4/1953 | Woollens et al. | 89/1.51 |
|---|---|---|---|---|---|
| 2,937,573 | A | * | 5/1960 | Gantschnigg | 89/1.51 |
| 3,069,116 | A | * | 12/1962 | Ward | 244/58 |
| 4,618,109 | A | * | 10/1986 | Victor | 244/130 |
| 4,991,796 | A | * | 2/1991 | Peters et al. | 244/58 |
| 5,174,719 | A | * | 12/1992 | Walsh et al. | 416/142 |
| 5,564,903 | A | * | 10/1996 | Eccles et al. | 416/174 |
| 5,820,074 | A | * | 10/1998 | Trommer et al. | 244/58 |
| 7,654,487 | B2 | * | 2/2010 | Ghoreishi et al. | 244/118.5 |
| 8,302,902 | B2 | * | 11/2012 | Lynas et al. | 244/58 |
| 8,602,736 | B2 | * | 12/2013 | Russ | 416/143 |
| 8,640,563 | B2 | * | 2/2014 | Lang et al. | 74/89.39 |
| 8,651,815 | B2 | * | 2/2014 | Russ | 416/143 |
| 8,777,587 | B2 | * | 7/2014 | Russ et al. | 417/229 |
| 8,840,451 | B2 | * | 9/2014 | Royalty et al. | 454/74 |
| 8,855,952 | B2 | * | 10/2014 | Spierling | 702/58 |
| 8,888,041 | B2 | * | 11/2014 | Hoffjann et al. | 244/118.2 |
| 8,931,734 | B2 | * | 1/2015 | Russ et al. | 244/58 |
| 2008/0142634 | A1 | * | 6/2008 | Moe et al. | 244/1 N |

FOREIGN PATENT DOCUMENTS

JP 2010-195149 A 9/2010

* cited by examiner

*Primary Examiner* — Medhat Badawi
(74) *Attorney, Agent, or Firm* — Pearne & Gordon LLP

(57) ABSTRACT

An aircraft door 18 which closes an opening of a storage space 16 for storing a RAT 13 as an accessory and which is opened in association with deployment of the RAT 13 from the storage space 16, the door including: a door body 20 that opens and closes the opening, and whose front surface faces an outside and whose rear surface faces the storage space 16 in a closed state; and a fence 24 that rises from the rear surface of the door body 20. In a traveling direction of the aircraft, the fence 24 is located anterior to a position where the RAT 13 is stored. The fence 24 prevents an airflow Air from passing through between the RAT 13 and the door body 20 in an initial stage where the door 18 starts to be opened, thereby suppressing the aerodynamic force in the closing direction acting on the door body 20.

17 Claims, 5 Drawing Sheets

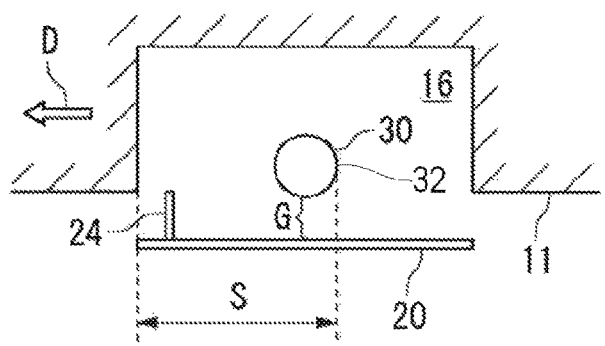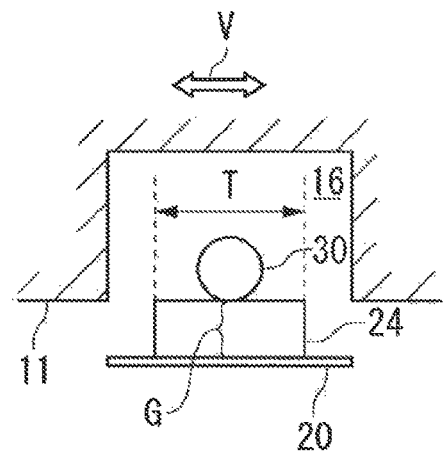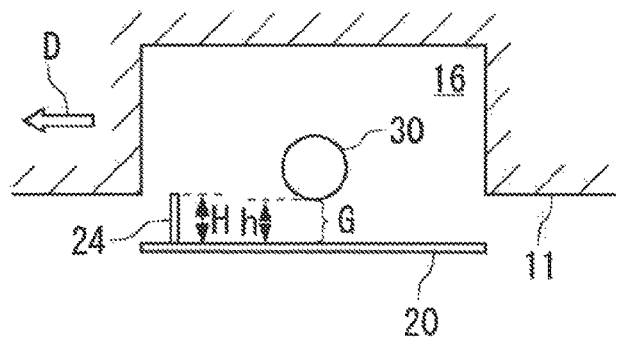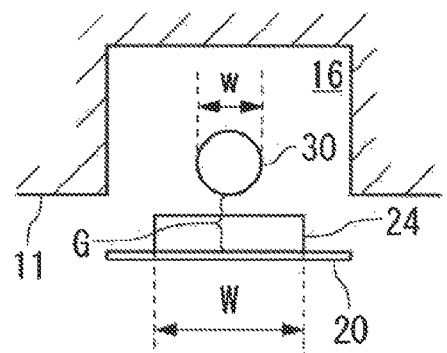

AIRCRAFT DOOR AND AIRCRAFT COMPRISING THE SAME

BACKGROUND OF THE INVENTION

Field of the Invention

The present invention relates to a door which is provided on an airframe surface of an aircraft.

Description of the Related Art

In aircraft, a door for opening and closing an opening of a storage bay for a ram air turbine (RAT, e.g., U.S. Pat. No. 5,820,074) or a door for opening and closing an opening of a storage bay for an landing gear (e.g., Japanese Patent Laid-Open No. 2010-195149) is provided as well as a door for opening and closing an opening for allowing passengers to enter and exit the aircraft, and an opening for loading and unloading cargos.

The RAT is normally stored in a storage bay provided in, for example, a center lower portion of a fuselage. In the event of an emergency in which an engine (including a power generator of the engine, the same applies hereinafter) and an auxiliary power unit break down and power from the engine and the auxiliary power unit is lost during a flight, the RAT is automatically deployed outside the aircraft to work as a wind-driven power generator or hydraulic pump and thereby ensure a drive force for emergency use. A door for opening and closing the storage bay for the RAT (referred to as RAT door below) is opened in synchronization with the automatic deployment of the RAT. The RAT door is provided so as to be rotatable about a shaft provided between the RAT door and an airframe with respect to the airframe. For example, the RAT door is powered by a hydraulic actuator to perform an opening and closing operation.

The door provided in the storage bay for the RAT is opened in association with the deployment of the RAT. When an opening degree of the door is still small in an initial stage of the deployment of the RAT, an aerodynamic force acts in a direction to close the door to possibly prevent the door from being opened. Thus, the aerodynamic force affects the capacity of the actuator for operating the door. In other words, if the aerodynamic force on the door can be reduced, the actuator requires a smaller capacity. A weight and a cost related to the door can be thereby reduced.

Thus, an object of the present invention is to provide an aircraft door capable of suppressing generation of an aerodynamic force acting in a direction to close the door in an initial stage where the door starts to be opened.

SUMMARY OF THE INVENTION

To achieve the above object, the present invention provides an aircraft door which closes an opening of a storage bay of an aircraft for storing an accessory and which is opened in association with deployment of the accessory from the storage bay, the door including: a door body that opens and closes the opening, and whose front surface faces an outside and whose rear surface faces the storage bay in a closed state; and a fence that rises from the rear surface of the door body. In a traveling direction of the aircraft, the fence is located anterior to a position where the accessory exists.

According to a study by the present inventors, an aerodynamic force generated in a direction to close the door is generated by a decrease in a pressure of a gap between the accessory (e.g., a RAT) and the door body caused when an airflow passes through the gap. In accordance with the present invention, the fence prevents the airflow from passing through the gap between the accessory and the door body in an initial stage where the door starts to be opened, thereby suppressing the aerodynamic force in the closing direction acting on the door body. Therefore, in accordance with the present invention, an actuator that drives the door requires a smaller capacity, so that a weight and a cost related to the door can be reduced.

In the aircraft door according to the present invention, to prevent the airflow from passing through between the accessory and the door body, a height of the fence is preferably larger than a gap between the accessory and the door body when an opening degree of the door is within a predetermined range. Similarly, the accessory is preferably arranged within a range of a region occupied by the fence in a direction perpendicular to the traveling direction as viewed along the traveling direction.

The present invention provides an aircraft including the above door. In the aircraft, a weight and a cost thereof can be reduced since an actuator that drives the door requires a smaller capacity.

In accordance with the present invention, the fence prevents the airflow from passing through between the accessory and the door body, thereby suppressing the aerodynamic force in the closing direction acting on the door body. Therefore, in accordance with the present invention, the actuator that drives the door requires a smaller capacity, so that the weight and the cost related to the door can be reduced.

BRIEF DESCRIPTION OF THE DRAWINGS

FIG. 1A shows a state in which a RAT is stored; and FIG. 1B shows a state in which the RAT is deployed;

FIGS. 3A and 3B show a state in which the door is closed; FIGS. 3C and 3D show a state in which the door is opened in an initial stage; and FIGS. 3E and 3F show a state in which the door is fully opened;

FIGS. 4A to 4D are views for explaining elements of the door according to the present embodiment.

DETAILED DESCRIPTION OF THE PREFERRED EMBODIMENT

In the following, the present invention is described in detail based on an embodiment shown in the accompanying drawings.

Figure 1A:
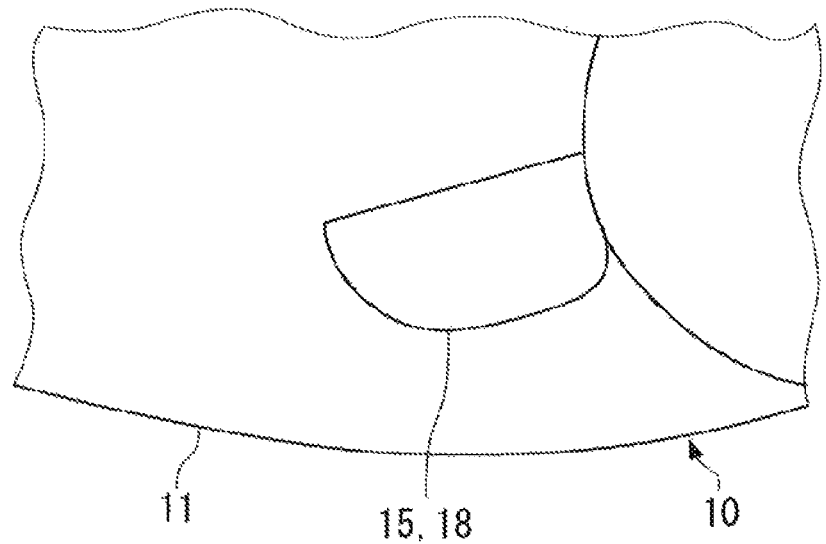
FIGS. 1A and 1B are views illustrating a region close to a nose of an aircraft according to an embodiment of the present invention.
Figure 1B:
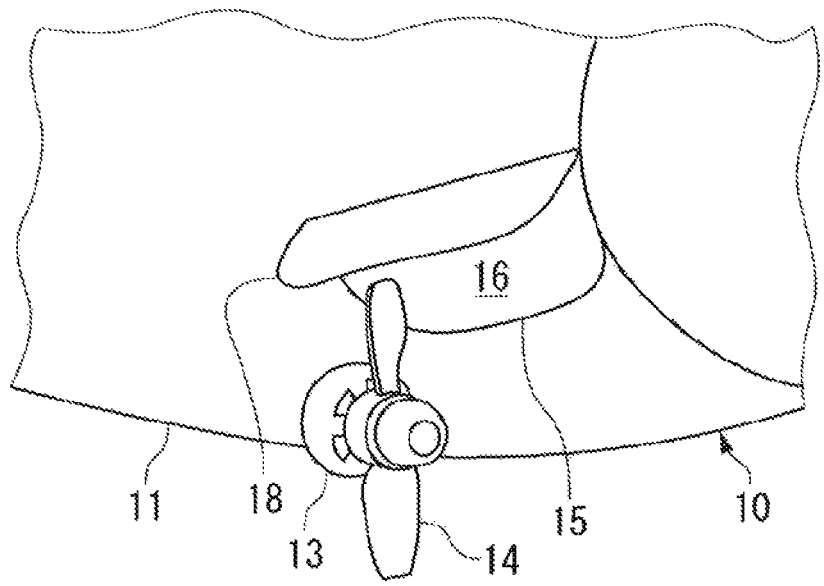

As shown in FIGS. 1A and 1B, an aircraft 10 includes a fuselage 11, a RAT 13, and a storage bay 15 that stores the RAT 13.

The RAT 13 is normally stored in the storage bay 15 as shown in FIG. 1A. In the event of an emergency in which power from an engine and an auxiliary power unit is lost, the RAT 13 is deployed outside the fuselage 11 from the storage bay 15 as shown in FIG. 1B. A turbine blade 14 is rotated upon receiving an airstream, thereby driving a power generator (not shown) to generate power.

The storage bay 15 includes a storage space 16 that is depressed inward from a surface of the fuselage 11 so as to have a sufficient volume for storing the RAT 13, and a door 18 that opens and closes an opening of the storage space 16. The door 18 performs the opening and closing operation in association with the deployment and storage of the RAT 13.

Figure 2A:
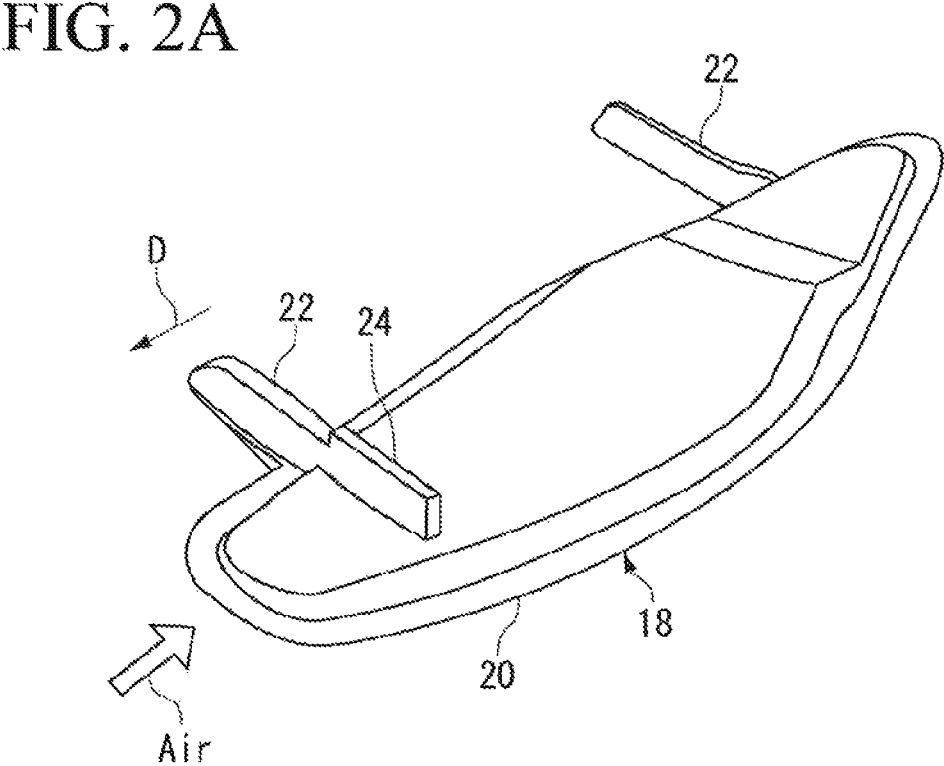
FIGS. 2A and 2B are views illustrating a door according to the present embodiment from a rear surface side.
Figure 2B:
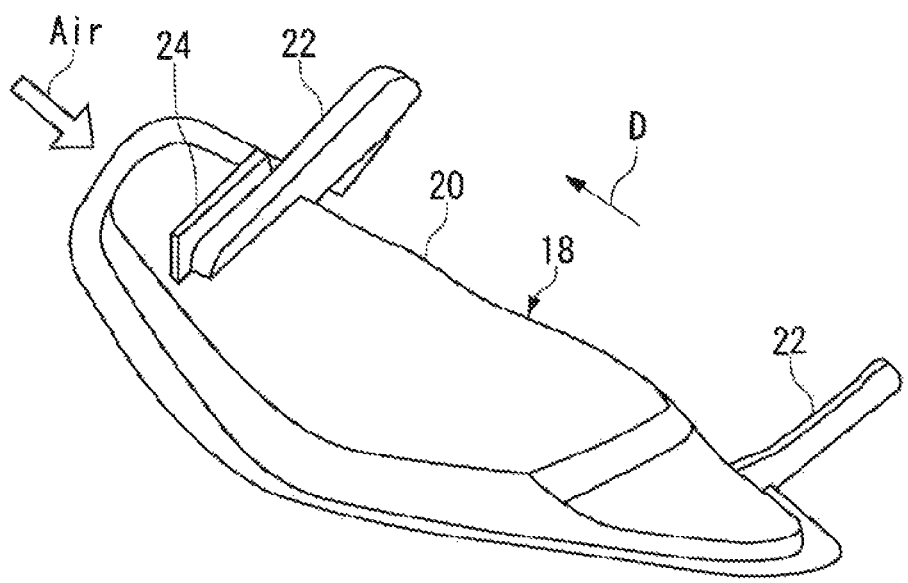

For example, as shown in FIGS. 2A and 2B, the door 18 includes a door body 20 that opens and closes the opening of the storage space 16, hinge arms 22 that are provided at two distant positions of the door body 20, and a fence 24 that is provided on a rear surface of the door body 20. A surface of the closed door 18 facing the outside is a front surface, and a surface thereof facing the storage space 16 is a rear surface. The hinge arms 22 are rotatably mounted to the fuselage 11, so that the door 18 can perform the opening and closing operation. Power for opening and closing the door 18 is obtained from an actuator (not shown).

The fence 24 is a flat plate-like member. The fence 24 is provided on a front side of a traveling direction D of the aircraft 10, and in a direction substantially perpendicular to the rear surface of the door body 20 when the door 18 is mounted to the fuselage 11. When the door 18 is in a closed state, the fence 24 projects toward the back of the storage space 16 from the rear surface of the door body 20. The fence 24 may be provided as a portion of the hinge arm 22 as shown in FIG. 2A, or may be also provided separately from the hinge arm 22 as shown in FIG. 2B.

Figure 3A:
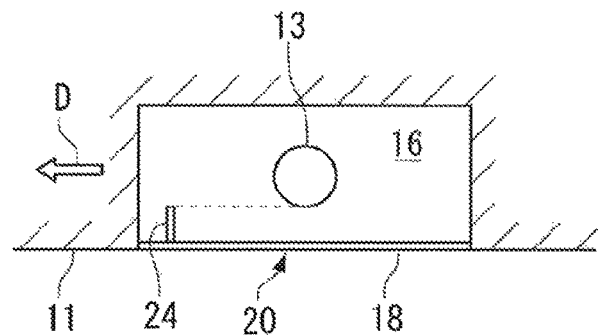
FIGS. 3A to 3F are views illustrating a region around the door according to the present embodiment in a simplified manner.

The fence 24 is provided so as to prevent an airflow from passing through between the RAT 13 as an accessory and the door body 20 in an initial stage where the closed door 18 starts to be opened in association with the deployment of the RAT 13. This point is described below by reference to FIGS. 3A to 3F. FIGS. 3A, 3C, 3E are views as viewed from a direction perpendicular to the traveling direction D, and FIGS. 3B, 3D, and 3F are views as viewed from a direction along the traveling direction D.

Figure 3B:
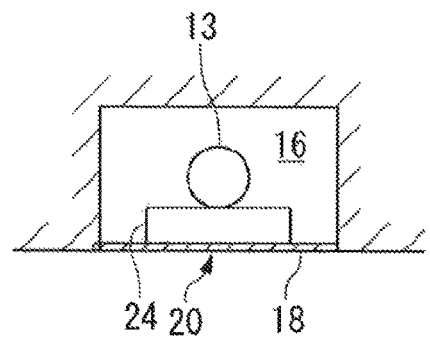
Figure 3C:
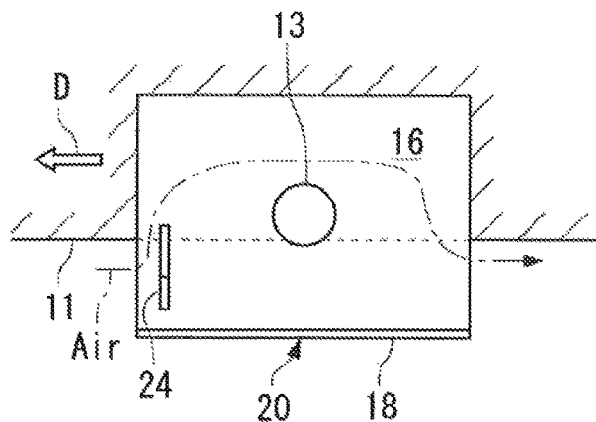
Figure 5:
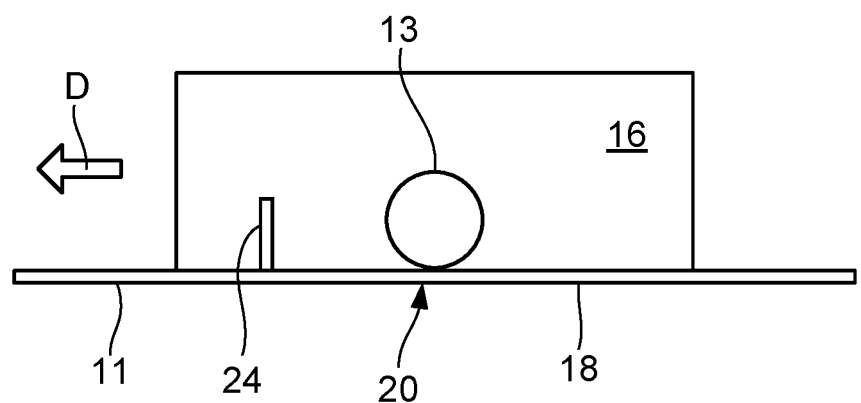
FIG. 5 is a view of the accessory (the RAT) arranged with no gap with the rear surface of the door body 20 in a stored state.

While the aircraft 10 is normally cruising, the RAT 13 is stored in the storage space 16, and the door 18 is closed as shown in FIGS. 3A and 3B. Although the RAT 13 is simply shown in a spherical shape, and arranged in substantially the center of an inner portion of the storage space 16 in FIGS. 3A and 3B, this is merely one example. For example, the accessory (the RAT 13) may be arranged with no gap with the rear surface of the door body 20 in a stored state, as shown in FIG. 5, or may be arranged at a position displaced from the center of the storage space 16 in the traveling direction D to a front or rear side.

Figure 3D:
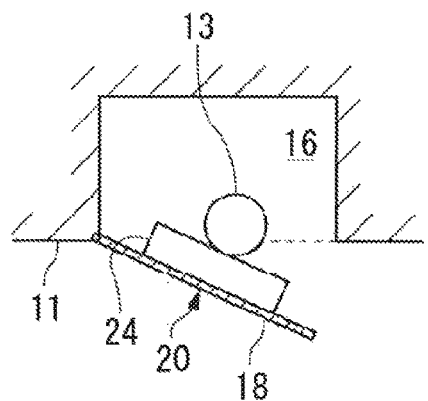
Figure 3E:
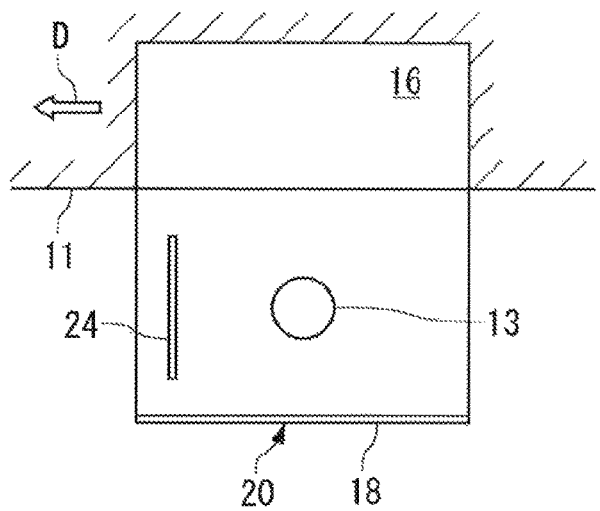
Figure 3F:
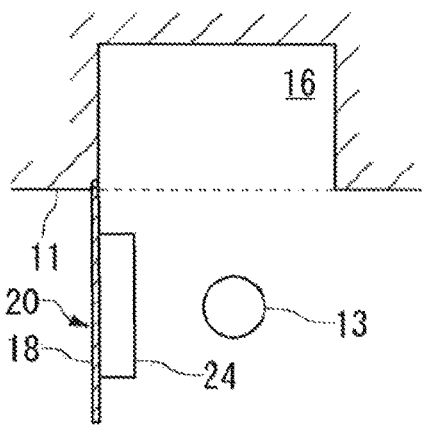

When the door 18 is opened as shown in FIGS. 3C, 3D in association with the deployment of the RAT 13, an airflow Air starts flowing between the door 18 and the storage space 16. One portion of the RAT 13 is located in the storage space 16. Since the fence 24 is provided on the rear surface of the door 18, the airflow Air cannot flow between the RAT 13 and the door body 20, and passes through the storage space 16 above the RAT 13 as shown in FIG. 3C. If the fence 24 is not provided, the airflow Air flows into a gap between the RAT 13 and the door body 20 and passes therethrough. An air pressure between the RAT 13 and the door body 20 is thereby reduced, so that the door body 20 receives a force in a closing direction. Therefore, the actuator for driving the door 18 needs to be provided with a capacity in consideration of the force in the closing direction. Meanwhile, in the present embodiment, the fence 24 is provided so as to prevent the airflow Air from flowing between the RAT 13 and the door body 20. Thus, the force in the direction to close the door body 20 is not generated due to the decrease in the pressure between the RAT 13 and the door body 20.

Since it is not necessary to consider the force in the closing direction for the actuator for driving the door 18, a small and inexpensive actuator can be used in the present embodiment.

When the door 18 is opened to a fully-open position as shown in FIGS. 3E and 3F, the RAT 13 starts a necessary operation. The fence 24 completes its role before the door 18 is opened to the fully-open position. That is, the fence 24 suppresses an aerodynamic force in the direction to close the door body 20 when an opening degree of the door 18 is within a predetermined range. The predetermined range is individually set for each aircraft.

Some elements required for the fence 24 that is provided so as to prevent the airflow Air from flowing between an accessory 30 and the door body 20 are described below.

[Position]

As shown in FIG. 4A, the fence 24 can be provided at any position of a region S. The region S is located anterior to a gap G between the accessory 30 and the door body 20 in the traveling direction D. When the fence 24 is provided at any position within the range of the region S, the airflow Air can be prevented from passing through the gap G. The gap G may have a considerable length in the traveling direction D depending on the shape and dimensions of the accessory. In this case, the fence 24 may be located anterior to a rear end 32 of the gap G in the traveling direction D, that is, anterior to a position where the accessory 30 exists. The airflow Air can be thereby prevented from passing through the gap G.

The effect of the fence 24 can be exerted even when the fence 24 is provided at any position within the range of the region S. When the accessory is in contact with the door body 20 with no gap therebetween in a stored state, the fence 24 is provided at a position not interfering with the accessory. That is, the position of the fence 24 may be specified in relation to the accessory.

As to a direction V perpendicular to the traveling direction D, the fence 24 is provided such that the accessory 30 is arranged within the range of a region T occupied by the fence 24 in the direction V as viewed along the traveling direction D as shown in FIG. 4B. The airflow Air can be thereby prevented from passing through the gap G. Even when the region T and the accessory 30 do not partially overlap each other, the effect of preventing the airflow Air from passing through the gap G can be obtained although at a lower level.

[Height and Width]

The fence 24 is provided to prevent the airflow Air from passing through the gap G. Therefore, as shown in FIG. 4C, the fence 24 preferably has a height H equal to or larger than a length h of the gap G. However, even when the height H is smaller than the length h, the effect of preventing the airflow Air from passing through the gap G can be partially obtained. Thus, it is not an essential element in the present invention that the height H is equal to or larger than the length h. To reliably prevent the airflow Air from passing through the gap G, the height H is preferably equal to or larger than the length h. The height H can be determined in consideration of a distance between the fence 24 and the accessory 30. The length h is identified at a position closest to the door body 20 in the accessory 30.

The height H of the fence 24 is preferably changed corresponding to the position of the fence 24. That is, it is preferable that the height H is made larger as the position of the fence 24 is closer to the front of the traveling direction D, that is, farther from the accessory 30. The height H is made larger since the airflow Air blocked by the fence 24 possibly changes its direction to pass through the gap G when the fence 24 is provided away from the accessory 30.

On the other hand, when the fence 24 is provided close to the accessory 30, the height H can be made smaller as compared to the case in which the fence 24 is provided away from the accessory 30 since the blocked airflow Air is unlikely to change its direction to pass through the gap G.

As shown in FIG. 4D, the fence 24 preferably has a width W equal to or larger than a width w of the accessory 30. However, even when the width W is smaller than the width w, the effect of preventing the airflow Air from passing through the gap G can be partially obtained. Thus, it is not an essential element in the present invention that the width W is equal to or larger than the width w. To reliably prevent the airflow Air from passing through the gap G, the width W is preferably equal to or larger than the width w. The width W can be determined in consideration of a distance between the fence 24 and the accessory 30. The width w is identified at a portion with a largest width in the accessory 30.

The width W of the fence 24 can be changed corresponding to the position of the fence 24 in a similar manner to the height H.

[Shape and Configuration]

Although a planar shape of the fence 24 is a rectangular shape, the planar shape of the fence is not limited as long as the object of the present invention can be achieved. A polygonal shape such as a triangle and a pentagon, an indefinite shape, or any other shapes may be employed. The shape of the accessory 30 is preferably considered. For example, when the planar shape of the accessory 30 is a circular shape, an overlapping portion with the accessory 30 may be cut out from the fence 24. That is, the fence 24 may have a planar shape matching the shape of the accessory 30.

Although a cross-sectional shape of the fence 24 is also a rectangular shape, the present invention is not limited thereto, and any cross-sectional shape may be employed. For example, a surface receiving the airflow Air may be an inclined surface.

Although the present invention has been described based on the embodiment, the constitutions described in the aforementioned embodiment may be also freely selected or changed into other constitutions without departing from the scope of the present invention.

For example, the example in which the RAT 13 is used as the accessory has been described in the above embodiment, application of the present invention is not limited to the RAT 13. A storage bay for a main landing gear of the aircraft also includes a door that is opened and closed in association with the deployment and storage of the main landing gear as the accessory. The present invention can be applied to the storage bay. The present invention can be also applied to an element of the aircraft where a gap is formed between an accessory and a door when the door is opened in association with the deployment of the accessory.

Any material may be employed.

What is claimed is:

1. An aircraft door which closes an opening of a storage bay of an aircraft for storing an accessory and which is opened in association with deployment of the accessory from the storage bay, the door comprising:
    a door body that opens and closes the opening and establishes a gap between the door body and the accessory when an opening degree of the door is within a predetermined range, and whose front surface faces an outside and whose rear surface faces the storage bay in a closed state;
    a fence that rises from the rear surface of the door body and extends longitudinally in a transverse direction across a traveling direction of the aircraft, the fence having a height relative to a length of the gap suitable to prevent at least a portion of an airflow from passing through the gap when the door is opened within the predetermined range, and allow at least a portion of an airflow to pass through the gap when the door is opened beyond the predetermined range to a fully-open state, wherein in a traveling direction of the aircraft, the fence is located anterior to a position where the accessory exists; and
    a connector that cooperates with a portion of the aircraft to allow the door body to open and form the gap having a variable distance between the door body and the accessory as the opening degree of the door is adjusted under control of an actuator within the predetermined range.

2. The aircraft door according to claim 1, wherein in the traveling direction, the fence is located anterior to a position which substantially corresponds to a rear end portion of the accessory.

3. The aircraft door according to claim 1, wherein in the traveling direction, the fence is located anterior to a position which substantially corresponds to a front end portion of the accessory.

4. The aircraft door according to claim 1, wherein the accessory is arranged within a range of a region occupied by the fence in a direction perpendicular to the traveling direction as viewed along the traveling direction.

5. The aircraft door according to claim 1, wherein the accessory is a ram air turbine.

6. The aircraft door according to claim 1, wherein the fence is oriented in a direction substantially perpendicular to the rear surface of the door body.

7. The aircraft door according to claim 1, wherein the fence is provided at a position not interfering with the accessory, when the accessory is in contact with the door body with no gap between the accessory and the door body in a stored state.

8. The aircraft door according to claim 1, wherein the door is driven by an actuator.

9. An aircraft comprising the aircraft door according to claim 1.

10. The aircraft door according to claim 1, wherein the fence is configured so as to prevent the airflow from passing between the accessory and the door body in an initial stage where the closed door starts to be opened in association with the deployment of the accessory from the storage bay.

11. The aircraft door according to claim 10, wherein the fence is configured so as to allow the airflow to pass between the accessory and the door body after the door body has been opened beyond the initial stage where the closed door starts to be opened.

12. An aircraft door which closes an opening of a storage bay of an aircraft for storing an accessory and which is opened in association with deployment of the accessory from the storage bay, the door comprising:
    a door body that opens and closes the opening and establishes a gap (G) between the door body and the accessory when an opening degree of the door is within a predetermined range, and whose front surface faces an outside and whose rear surface faces the storage bay in a closed state; and
    a fence that rises from the rear surface of the door body and extends longitudinally in a transverse direction across a traveling direction of the aircraft, the fence having a height (H) that is greater than or equal to a length (h) of the gap (G) when the opening degree of the door is within the predetermined range to prevent at least a portion of an airflow from passing through the gap when the door is opened within the predetermined range, the fence further comprising a width (W) that is greater than or equal to a width (w) of the accessory, and the fence allows at least a portion of an airflow to pass through the gap when the door is opened beyond the predetermined range to a fully-open state, wherein in a traveling direction of the aircraft, the fence is located anterior to a position where the accessory exists.

13. The aircraft door according to claim 12,
wherein the accessory is a ram air turbine.

14. The aircraft door according to claim 12,
wherein the fence is oriented in a direction substantially perpendicular to the rear surface of the door body.

15. An aircraft comprising the aircraft door according to claim 12.

16. The aircraft door according to claim 12, wherein the fence is configured so as to prevent the airflow from passing between the accessory and the door body in an initial stage where the closed door starts to be opened in association with the deployment of the accessory from the storage bay.

17. The aircraft door according to claim 16, wherein the fence is configured so as to allow the airflow to pass between the accessory and the door body after the door body has been opened beyond the initial stage where the closed door starts to be opened.

* * * * *